(12) United States Patent
Huang et al.

(10) Patent No.: US 11,081,937 B2
(45) Date of Patent: Aug. 3, 2021

(54) INTEGRATED MOTOR DRIVE AND INTEGRATED HEAT DISSIPATION SYSTEM

(71) Applicant: CHICONY POWER TECHNOLOGY CO., LTD., New Taipei (TW)

(72) Inventors: Wang-Hsuang Huang, New Taipei (TW); Chen-Shi Chou, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 497 days.

(21) Appl. No.: 16/048,656

(22) Filed: Jul. 30, 2018

(65) Prior Publication Data
US 2019/0393759 A1    Dec. 26, 2019

(30) Foreign Application Priority Data

Jun. 22, 2018   (TW) ................................. 107121564

(51) Int. Cl.
| | |
|---|---|
| *H02K 9/20* | (2006.01) |
| *H02K 5/20* | (2006.01) |
| *H02K 11/33* | (2016.01) |
| *H02K 9/06* | (2006.01) |
| *H02K 5/24* | (2006.01) |

(52) U.S. Cl.
CPC .................. *H02K 9/20* (2013.01); *H02K 5/20* (2013.01); *H02K 5/24* (2013.01); *H02K 9/06* (2013.01); *H02K 11/33* (2016.01)

(58) Field of Classification Search
CPC ............. H02K 9/20; H02K 11/33; H02K 5/20
USPC ........................... 310/51, 53, 54, 62, 63, 64
See application file for complete search history.

(56) References Cited

U.S. PATENT DOCUMENTS

| | | | |
|---|---|---|---|
| 6,633,097 B2 | 10/2003 | Dunlap | |
| 2003/0048031 A1* | 3/2003 | Dunlap | .................... H02K 5/20 310/254.1 |
| 2007/0075595 A1* | 4/2007 | Narayanan | ............. H02K 15/14 310/52 |
| 2007/0199682 A1* | 8/2007 | Hwang | ................. F28D 15/046 165/104.26 |

(Continued)

FOREIGN PATENT DOCUMENTS

| | | |
|---|---|---|
| CN | 202353389 U | 7/2012 |
| CN | 102906974 A | 1/2013 |

(Continued)

*Primary Examiner* — Jose A Gonzalez Quinones
(74) *Attorney, Agent, or Firm* — Muncy, Geissler, Olds & Lowe, P.C.

(57) ABSTRACT

An integrated motor drive includes a frame assembly, a motor, a motor driver and a heat dissipation assembly. The frame assembly includes a first frame and a second frame. The motor is installed on the first frame. The motor driver is installed on the second frame. The heat dissipation assembly includes a motor heat exchange pipe, a motor driver heat exchange pipe, and a heat dissipation pipe. The motor heat exchange pipe is embedded in the first frame, and located at one side portion of the motor for performing heat exchange with the motor. The motor driver heat exchange pipe is embedded in the second frame for performing heat exchange with the motor driver. The heat dissipation pipe is located at an end portion of the motor, and communicated with the motor heat exchange pipe and the motor driver heat exchange pipe.

15 Claims, 12 Drawing Sheets

(56) References Cited

U.S. PATENT DOCUMENTS

| | | | | |
|---|---|---|---|---|
| 2013/0026866 | A1* | 1/2013 | Morisaki | H02K 11/33 310/51 |
| 2013/0126144 | A1* | 5/2013 | Sheu | F28F 9/26 165/181 |
| 2014/0306563 | A1* | 10/2014 | Oyama | H02M 7/003 310/71 |
| 2015/0314669 | A1* | 11/2015 | Noda | B60H 1/00921 62/324.1 |

FOREIGN PATENT DOCUMENTS

| | | | |
|---|---|---|---|
| CN | 103138486 A | | 6/2013 |
| CN | 104979936 A | | 10/2015 |
| CN | 103683685 B | | 9/2016 |
| CN | 206023492 U | | 3/2017 |
| CN | 206517238 U | | 9/2017 |
| CN | 105099084 B | | 10/2017 |
| CN | 207410215 U | | 5/2018 |
| JP | 05087473 A | * | 4/1993 |
| JP | H07154940 A | | 6/1995 |
| JP | 2012110151 A | * | 6/2012 |
| TW | M361825 U | | 7/2009 |
| TW | M399545 | | 3/2011 |
| TW | I455461 | | 10/2014 |
| TW | M546632 | | 8/2017 |

* cited by examiner

INTEGRATED MOTOR DRIVE AND INTEGRATED HEAT DISSIPATION SYSTEM

CROSS REFERENCE TO RELATED APPLICATIONS

This Non-provisional application claims priority under 35 U.S.C. § 119(a) on Patent Application No(s). 107121564 filed in Taiwan, Republic of China on Jun. 22, 2018, the entire contents of which are hereby incorporated by reference.

BACKGROUND

Technology Field

The present disclosure relates to a motor drive and a heat dissipation system. In particular, the present disclosure relates to an integrated motor drive and an integrated heat dissipation system.

Description of Related Art

The integrated motor drive (IMD) device mainly includes a motor and a motor driver. The motor driver can drive the motor to rotate. In general, the motor driver is an inverter. Moreover, the motor driver further includes a controller for controlling the rotation speed of the motor.

For example, in the integrated motor drive device, the motor and the inverter are assembled and integrated together. This configuration has the advantages of saving power and space. Thus, the expansive connecting wires between the motor and the inverter can be reduced, and the external connection and layout can be also minimized. This integration design can decrease the required space for the integrated motor drive device, and the decreased layout can also make the circuit design much simpler.

However, in the integration design, the vibration of the motor can be easily transferred to the inverter, which may cause the damage of the inverter. In addition, the heat generated by the operating motor can also be transferred to the inverter, which can reduce the lifetime of the inverter.

Therefore, it is an importance subject to provide an integrated motor drive and an integrated heat dissipation system that can rapidly dissipate the generated heat and have a simple assembling feature.

SUMMARY

In view of the foregoing, the present disclosure provides an integrated motor drive and an integrated heat dissipation system that can rapidly dissipate the generated heat and have a simple assembling feature.

An integrated motor drive includes a frame assembly, a motor, a motor driver and a heat dissipation assembly. The frame assembly comprises a first frame and a second frame. The motor is installed on the first frame, and the motor driver is installed on the second frame. The heat dissipation assembly comprises a motor heat exchange pipe, a motor driver heat exchange pipe, and a heat dissipation pipe. The motor heat exchange pipe is embedded in the first frame and located at one side portion of the motor for performing heat exchange with the motor. The motor driver heat exchange pipe is embedded in the second frame for performing heat exchange with the motor driver. The heat dissipation pipe is located at an end portion of the motor and communicated with the motor heat exchange pipe and the motor driver heat exchange pipe.

In one embodiment, the heat dissipation assembly further comprises a heat dissipation element disposed in the second frame, communicated with the motor driver heat exchange pipe, and located corresponding to at least a transistor of the motor driver.

In one embodiment, the heat dissipation assembly further comprises a cooler, a plurality of pipe connectors and a pump. The cooler is disposed at the end portion of the motor, and the heat dissipation pipe passes through the cooler. The pipe connectors connect the motor heat exchange pipe, the motor driver heat exchange pipe, and the heat dissipation pipe. The pump drives a fluid to flow in the motor heat exchange pipe, the motor driver heat exchange pipe, and the heat dissipation pipe.

In one embodiment, the heat dissipation assembly further comprises a plurality of pipe connectors and a pump. The pipe connectors connect the motor heat exchange pipe, the motor driver heat exchange pipe, and the heat dissipation pipe. The pump drives a fluid to flow in the motor heat exchange pipe, the motor driver heat exchange pipe, and the heat dissipation pipe. The first frame covers the side portion and the end portion of the motor, and the heat dissipation pipe is embedded in the first frame.

In one embodiment, the second frame comprises a protruding portion, and the protruding portion forms the heat dissipation element.

In one embodiment, at least a micro flow channel is disposed inside the protruding portion.

In one embodiment, the heat dissipation assembly further comprises a fan disposed at an outer side of the end portion of the motor, and an air outlet of the fan is disposed opposite to the end portion.

In one embodiment, the integrated motor drive further comprises a damping element disposed between the first frame and the second frame.

In one embodiment, the heat dissipation assembly further comprises a plurality of fins disposed on the first frame.

In one embodiment, the motor heat exchange pipe further comprises a plurality of heat exchange microstructures disposed inside the motor heat exchange pipe.

In one embodiment, a width of the motor heat exchange pipe is gradually changed.

In one embodiment, the motor heat exchange pipe has a spiral shape.

In one embodiment, the motor heat exchange pipe comprises an axial channel and a circular channel communicated with each other.

In one embodiment, the first frame is a sleeve mounted on the motor.

In one embodiment, the motor heat exchange pipe has different distribution densities in different areas of the first frame.

In one embodiment, the motor heat exchange pipe and the first frame are integrally formed as one piece.

In one embodiment, the motor heat exchange pipe, the motor driver heat exchange pipe, the first frame, and the second frame are integrally formed as one piece.

An integrated heat dissipation system, which is applied to a motor and a motor driver, comprises a frame assembly and a heat dissipation assembly. The frame assembly comprises a first frame and a second frame. The motor is installed on the first frame, and the motor driver is installed on the second frame. The heat dissipation assembly comprises a motor heat exchange pipe, a motor driver heat exchange pipe and a heat dissipation pipe. The motor heat exchange pipe is embedded in the first frame and located at one side portion of the motor for performing heat exchange with the motor. The motor driver heat exchange pipe is embedded in the second frame for performing heat exchange with the motor driver. The heat dissipation pipe is located at an end portion of the motor and communicated with the motor heat exchange pipe and the motor driver heat exchange pipe.

As mentioned above, the integrated motor drive and integrated heat dissipation system of this disclosure have a frame assembly and a heat dissipation assembly, so that the fluid heat exchange pipes can pass through the motor and the motor driver. In addition, the motor heat exchange pipe is disposed on another frame, so that the rapid heat dissipation can be achieved and the assembling can be easier.

In some embodiments, the motor is installed on the inner surface of the frame assembly, and the motor driver is installed on the outer surface or an outer surface portion of the frame assembly. The frame assembly is further configured with the fins for speeding the heat dissipation. Compared with the conventional integrated motor drive, the frame assembly is configured between the motor and the motor driver of this disclosure. Since the motor driver is not installed on the upper end the motor by screwing or sliding track, the vibration of the motor transmitted to the motor driver can be decreased. In addition, a damping material can be disposed between the motor and the motor driver for reducing the vibration transmitted from the motor to the motor driver.

Moreover, in some embodiments, the frame can be an additional sleeve, which can be mounted and fixed on the motor if necessary. This configuration is very simple and can improve the heat dissipation efficient. The housing of the motor driver and the above-mentioned sleeve can be integrated formed as one piece. This design can further speed the assembling procedure. In addition, an additional fan can be provided to further improve the heat dissipation effect of the integrated motor and motor driver.

Furthermore, in some embodiments, a water cooler system can be integrated in this disclosure for simultaneously dissipating the heat of the motor and the motor driver. A row water cooler can be installed on the bottom of the sleeve frame, so that the heat of the row water cooler can be dissipated by the fan. In addition, a water cooling head can be provided on the heat source of the motor driver for enhancing the heat dissipation efficient.

In some embodiments, the pipe wall of the heat exchange pipe can be designed with some microstructures to increase the total heat-dissipation surface. Besides, the width of the heat exchange pipe can be modified based on the temperature. The fins can be provided on the outer surface portion of the sleeve frame. This disclosure can integrate the water cooling and the air cooling technologies for further enhancing the heat dissipation effect.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
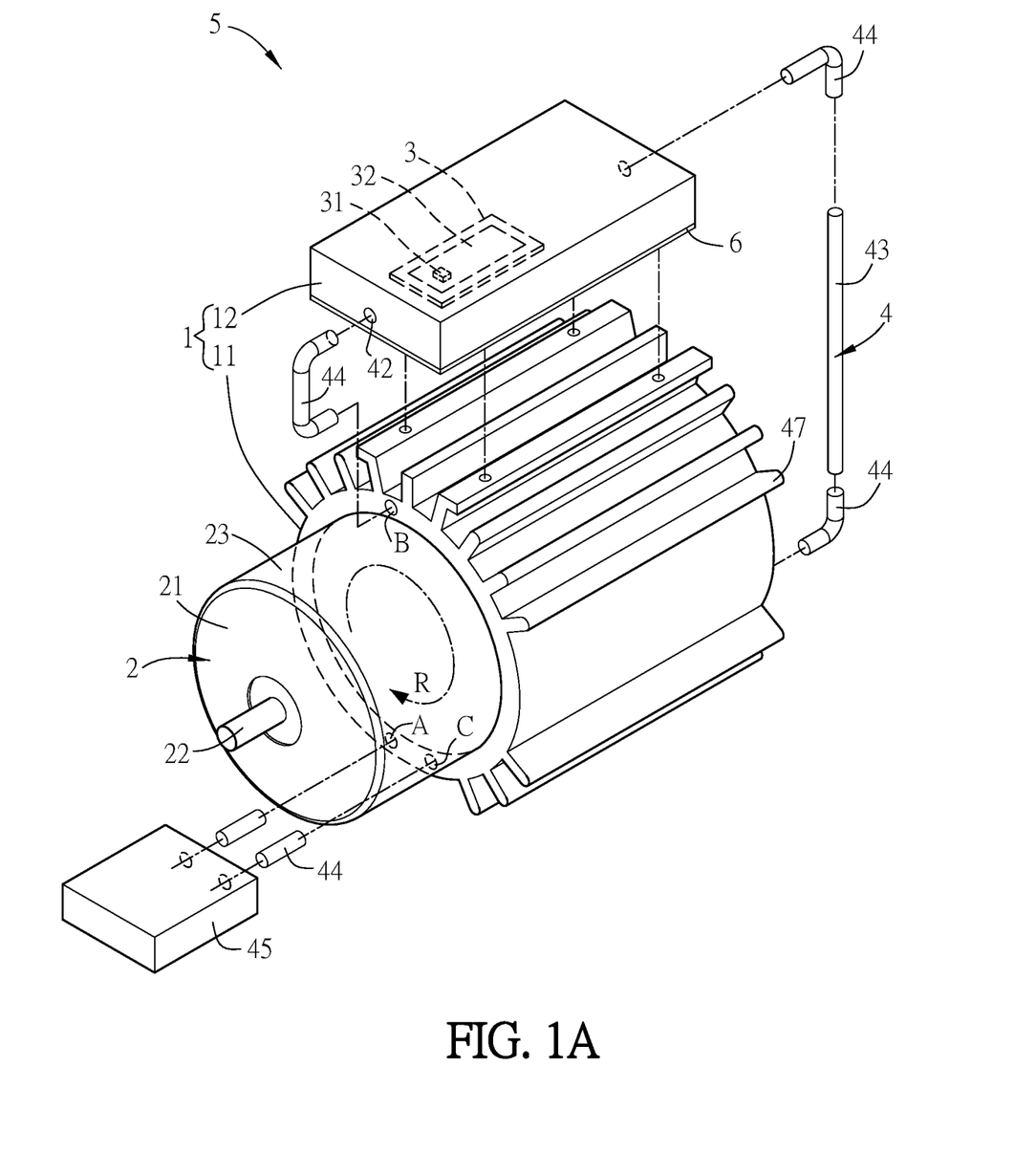
FIG. 1A is a schematic diagram showing an integrated motor drive according to an embodiment.
Figure 1B:
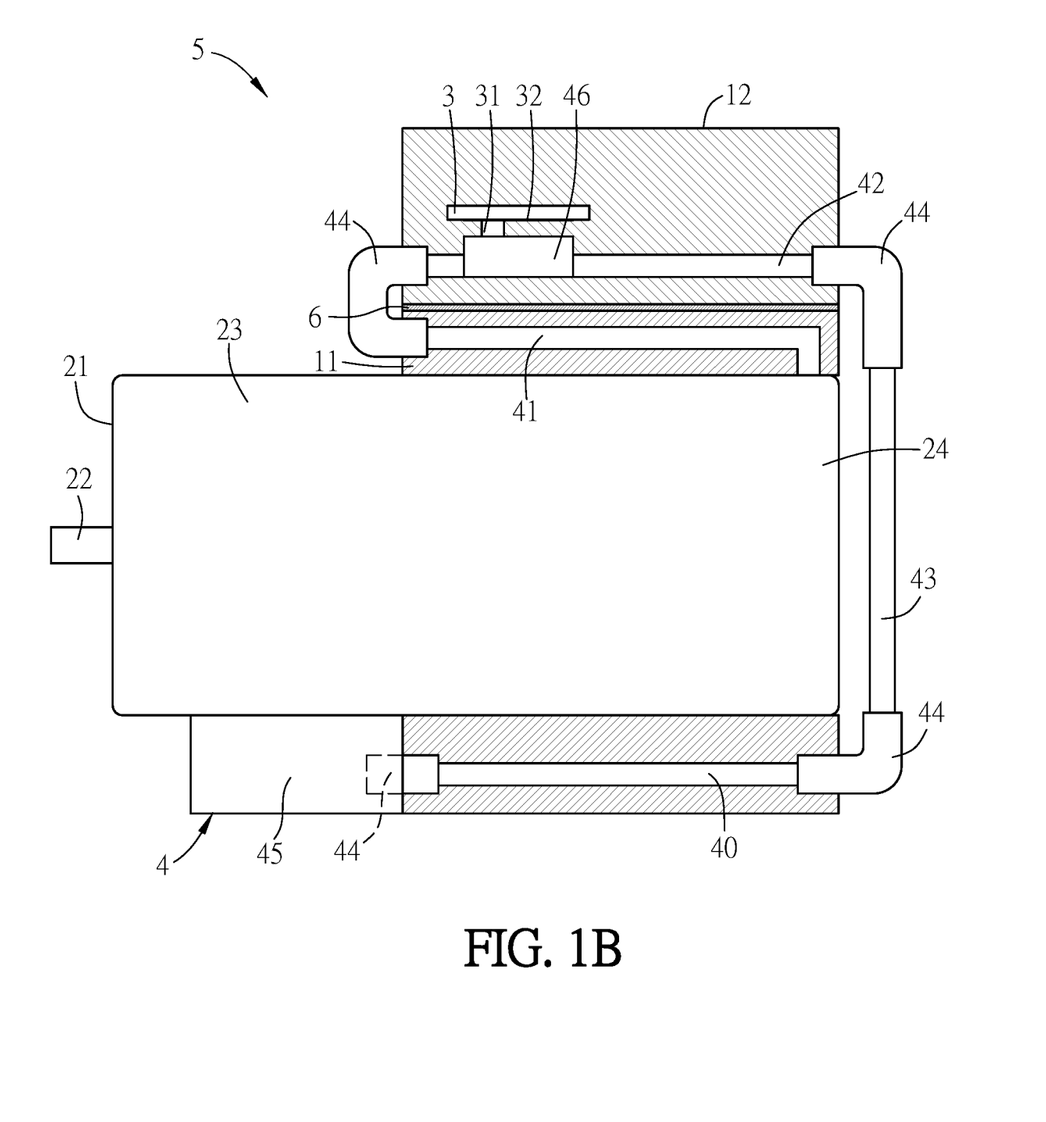
FIG. 1B is a front view of the integrated motor drive of FIG. 1A.

FIG. 1A is a schematic diagram showing an integrated motor drive according to an embodiment, and FIG. 1B is a front view of the integrated motor drive of FIG. 1A. Referring to FIGS. 1A and 1B, an integrated motor drive 5 includes a frame assembly 1, a motor 2, a motor driver 3, and a heat dissipation assembly 4. The frame assembly 1 is provided to integrate the motor 2 and the motor driver 3. The motor driver 3 is designed according to the connected motor 2, so that the motor 2 can achieve the maximum efficient. Besides, this design can sufficiently simplify the wire configuration between the motor, sensing device, driver and control system.

The motor 2 includes a motor housing 21 and a shaft 22. The shaft 22 protrudes and extends from one end of the motor housing 21. The shaft 22 can connect to another device for driving it to rotate. The internal elements of the motor 2 are configured within the motor housing 21. The internal elements can be, for example, a rotor and a stator. The shaft 22 is installed on the rotor, and the rotor can drive the shaft 22 to rotate.

The motor driver 3 includes a driver circuit 31 electrically connecting to the motor 2 for driving the motor 2 to rotate. The driver circuit 31 is, for example, an inverter, which includes at least one transistor 32 (e.g. a power transistor). The driver circuit 31 can be formed on a circuit board, and the circuit board can be installed on the second frame 12. In addition, based on the type of the motor 2, the driver circuit can also be a converter.

In addition, the motor driver 3 can electrically connect to an external control system for controlling the rotation speed of the motor. For example, the external control system may output a control signal to the motor driver 3. Alternatively, the motor driver 3 may include a controller, which can output a control signal to the inverter of the motor driver 3. The control signal can control the current, voltage, or frequency outputted from the motor driver 3 to the motor 2, thereby controlling the rotation speed of the motor. The control signal can be, for example, a PWM signal or a digital signal, which may carry an instruction.

The frame assembly 1 includes a first frame 11 and a second frame 12. The motor 2 is installed on the first frame 11, and the motor driver 3 is installed on the second frame 12. The heat dissipation assembly 4 includes a motor heat exchange pipe 41, a motor driver heat exchange pipe 42, and a heat dissipation pipe 43. The motor heat exchange pipe 41 is embedded in the first frame 11 and located at one side portion 23 of the motor 2 for performing heat exchange with the motor 2. The motor driver heat exchange pipe is embedded in the second frame 12 for performing heat exchange with the motor driver 3. The heat dissipation pipe 43 is located at an end portion 24 of the motor 2 and communicated with the motor heat exchange pipe 41 and the motor driver heat exchange pipe 42.

The heat dissipation assembly 4 further includes a plurality of pipe connectors 44 and a pump 45. The pipe connectors 44 individually connect to the motor heat exchange pipe 41, the motor driver heat exchange pipe 42, and the heat dissipation pipe 43. The pump 45 drives a fluid to flow in the motor heat exchange pipe 41, the motor driver heat exchange pipe 42, and the heat dissipation pipe 43. In this embodiment, the heat dissipation assembly 4 is a water cooler heat dissipation system. Herein, a water tank (not shown) can be provided to integrate with the pump 45 or the heat dissipation pipe 43.

For example, the pump 45 can drive the fluid to flow into the opening of the motor heat exchange pipe 41 at the position A. The fluid can flow inside the motor heat exchange pipe 41 and perform heat exchange to carry out the heat of the motor 2. Afterwards, the fluid leaves the motor heat exchange pipe 41 at the position B and then enters the motor driver heat exchange pipe 42. Then, the fluid flows inside the motor driver heat exchange pipe 42 and perform heat exchange to carry out the heat of the motor driver 3. Afterwards, the fluid leaves the motor driver heat exchange pipe 42 and then enters the heat dissipation pipe 43. In the heat dissipation pipe 43, the fluid can dissipate the heat absorbed in the motor heat exchange pipe 41 and the motor driver heat exchange pipe 42. Accordingly, the heat of the motor 2 and the motor driver 3 can be dissipated. The fluid in the heat dissipation pipe 43 can return to the pump 45 at the position C through a reflow pipe 40, and the pump 45 can drive the fluid to flow into the motor heat exchange pipe 41 again at the position A. Then, the fluid can flow cyclically. Moreover, the fluid flowing in the reflow pipe 40 can also perform the heat exchange with the motor 2 to carry out the heat of the motor 2. Afterwards, the fluid also flows in the cyclic path as mentioned above to the heat dissipation pipe 43, thereby dissipating the heat absorbed in the reflow pipe 40 in the heat dissipation pipe 43. In other words, all pipes in the first frame 11 are all equipped with the heat exchange function, so that the fluid can absorb the heat generated by the motor 2 while flowing in these pipes and dissipate the heat through the heat dissipation pipe 43.

The first frame 11 can be an annular motor sleeve mounted and fixed on the motor 2. The first frame 11 can be disposed around the surface of the motor 2 for achieving the effect of rapid heat dissipation. The second frame 12 can be used as the housing of the motor driver 3, and assembled with the first frame 11 (the annular motor sleeve) for achieving the effect of rapid heat dissipation of the driver. A fan can be further disposed outside the first frame 11 so as to achieve the effect of rapid heat dissipation.

The heat dissipation assembly 4 further includes a heat dissipation element 46 disposed in the second frame 12. The heat dissipation element 46 is communicated with the motor driver heat exchange pipe 42 and located corresponding to at least a transistor 32 of the motor driver 3. The transistor 32 is, for example, a power transistor. The heat generated by the transistor 32 can be transmitted to the heat dissipation element 46 and then carried out by the fluid inside the motor driver heat exchange pipe 42. For example, the heat dissipation element 46 is a water cooling head, which can be disposed on the heat source (e.g. the transistor 32) of the motor driver 3 for dissipating the heat and enhancing the heat dissipation effect. In addition, the heat dissipation assembly 4 further includes a plurality of fins 47, which are disposed on the first frame 11. The heat generated by the motor 2 and the motor driver 3 can be carried out by the fluid and dissipated by the heat dissipation pipe 43 and the fins 47. This configuration can integrate the designs of water cooling and air cooling for improving the heat dissipation effect.

The integrated motor drive 5 further includes a damping element 6 disposed between the first frame 11 and the second frame 12 (or between the motor 2 and the motor driver 3). The configuration of the damping element 6 can decrease the vibration transmission from the motor 2, thereby avoiding the damage of the motor driver 3.

In this embodiment, the inner surface of the frame assembly 1 is assembled with the motor 2, the second frame 12 of the frame assembly 1 is assembled with the motor driver 3, the outer surface of the first frame 11 is assembled with the lower surface of the second frame 12, and the fins 47 are disposed on the frame assembly 1. This configuration can speed the heat dissipation. Compared with the conventional integrated motor drive, the frame assembly 3 is configured between the motor 2 and the motor driver 3. Since the motor driver 3 is not installed on the upper end the motor 2 by screwing or sliding track, the vibration of the motor 2 transmitted to the motor driver 3 can be decreased. In addition, the damping element 6 can be disposed between the motor 2 and the motor driver 3 for reducing the vibration transmitted from the motor 2 to the motor driver 3.

In this embodiment, the first frame 11 is a sleeve mounted on the motor 2. The motor heat exchange pipe 41 and the first frame 11 can be integrated formed as one piece, and the material thereof can be metal. The first frame 11 can be an additional sleeve. During the assembling procedure, the first frame 11 can be mounted on the motor 2, and the first frame 11 and the motor 2 are screwed and fixed to each other. This configuration is very simple and can improve the heat dissipation efficient.

Figure 2A:
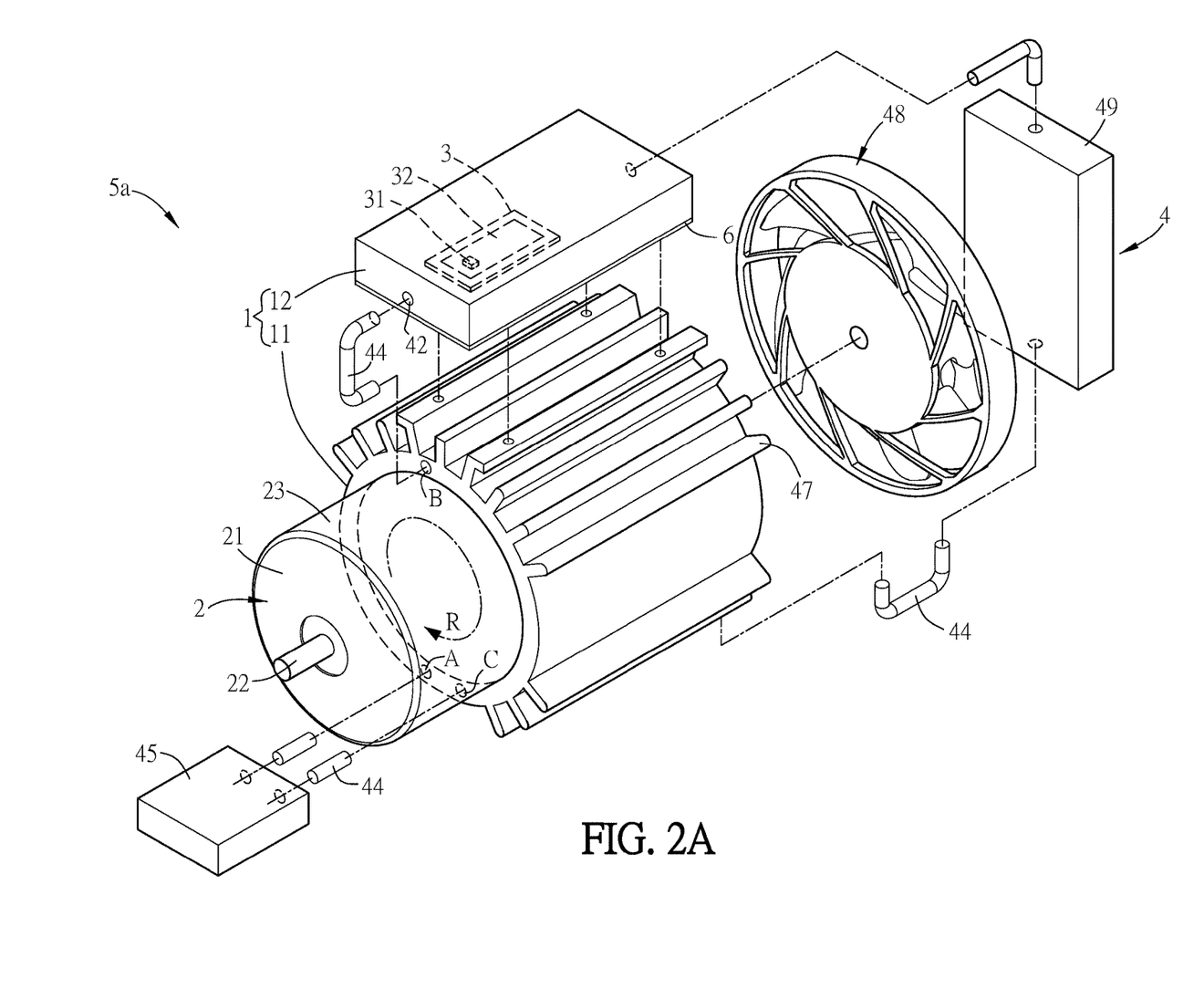
FIG. 2A is a schematic diagram showing an integrated motor drive according to an embodiment.
Figure 2B:
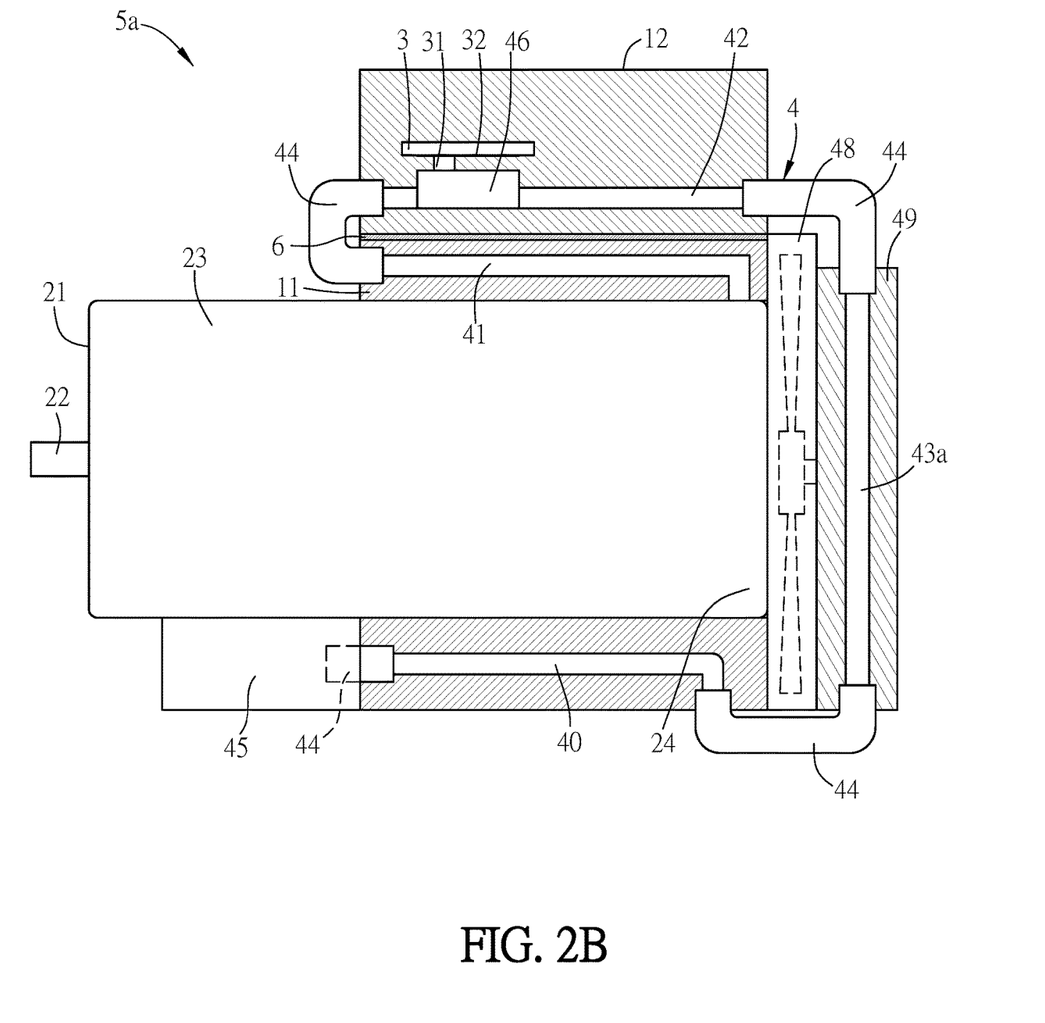
FIG. 2B is a front view of the integrated motor drive of FIG. 2A.

FIG. 2A is a schematic diagram showing an integrated motor drive according to an embodiment, and FIG. 2B is a front view of the integrated motor drive of FIG. 2A. The components of FIGS. 2A and 2B the same as, similar to and corresponding to those shown in FIGS. 1A and 1B will be referred to the same reference numbers.

As shown in FIGS. 2A and 2B, in the integrated motor drive 5a, the heat dissipation assembly 4 further includes a fan 48 and a cooler 49. The fan 48 is located at the outer side of the end portion 24 of the motor 2, and the air outlet of the fan 48 is disposed opposite to the end portion 24. The cooler 49 is located at the outer side of the end portion 24 of the motor 2, and the heat dissipation pipe 43a passes through the cooler 49. The cooler 49 can be, for example, a row water cooler. For example, the fan 48 is located between the cooler 49 and the end portion 24, or the cooler 49 is located between the fan 48 and the end portion 24.

For example, the water-cooling heat dissipation assembly 4 is an integrated component for dissipating the heat of the motor 2 and the motor driver 3. The first frame 11 is a sleeve, and the cooler 49 is installed at the bottom of the first frame 11. The fan 48 is configured to blow the heat of the cooler 49 away so as to enhance the heat dissipation effect. In addition, the fan 48 is an axial-flow fan for example. Alternatively, the fan 48 can be a side channel blower or a centrifugal fan.

FIGS. 3A to 3D are schematic diagrams showing some modified aspects of the motor heat exchange pipe. In FIGS. 3A to 3D, the position of the motor heat exchange pipe in the first frame is shown, the vertical axis corresponds to the circumferential direction R in the polar coordinates of FIG. 1A or 2A, the horizontal axis corresponds to the axial direction of the first frame 11 of FIG. 1A or 2A, and the positions A, B and C correspond to the positions A, B and C of FIG. 1A or 2A.

As shown in FIGS. 3A to 3D, the reflow pipe 40 is connected to the pump 45 at the position C, and the other end of the reflow pipe 40 is connected to the heat dissipation pipe 43. Accordingly, the fluid can flow from the heat dissipation pipe 43 to the pump 45 (the position C) through the reflow pipe 40.

Figure 3A:
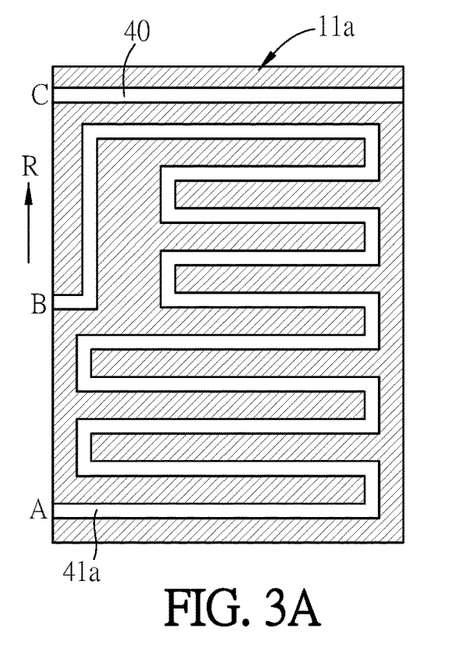
FIGS. 3A to 3D are schematic diagrams showing some modified aspects of the motor heat exchange pipe.

As shown in FIG. 3A, the motor heat exchange pipe 41a has a spiral shape. In the motor heat exchange pipe 41a, the straight portions mainly extend along the axial direction of the first frame 11a, and the round portions are distributed along the direction R.

Figure 3B:
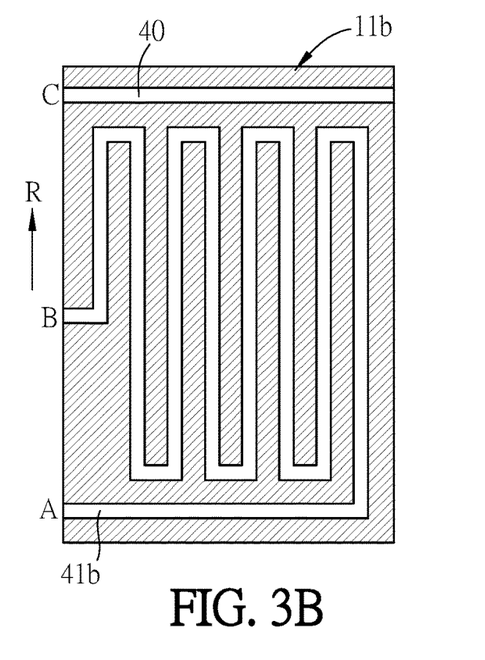

As shown in FIG. 3B, the motor heat exchange pipe 41b has a spiral shape. In the motor heat exchange pipe 41b, the straight portions mainly extend along the direction R, and the round portions are distributed along the axial direction of the first frame 11b.

Figure 3C:
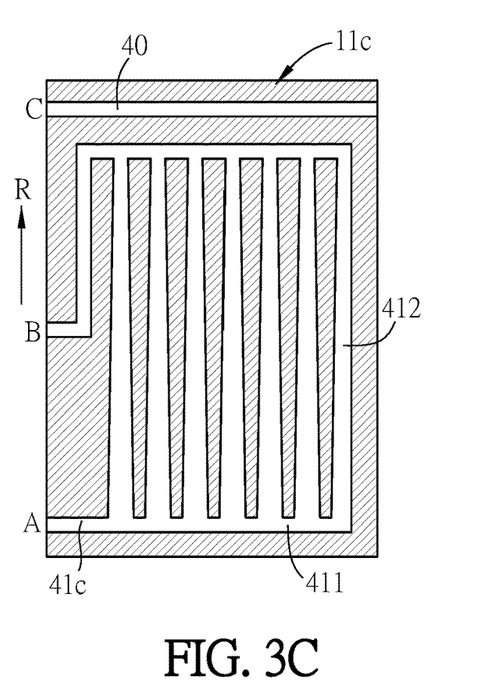

As shown in FIG. 3C, the motor heat exchange pipe 41c includes axial channels 411 and circular channels 412 communicated with each other. The axial channels 411 extend along the axial direction of the first frame 11c, and the circular channels 412 extend along the direction R. As shown in FIG. 3C, for example, the motor heat exchange pipe 41c includes two axial channels 411 and two or more circular channels 412.

Figure 3D:
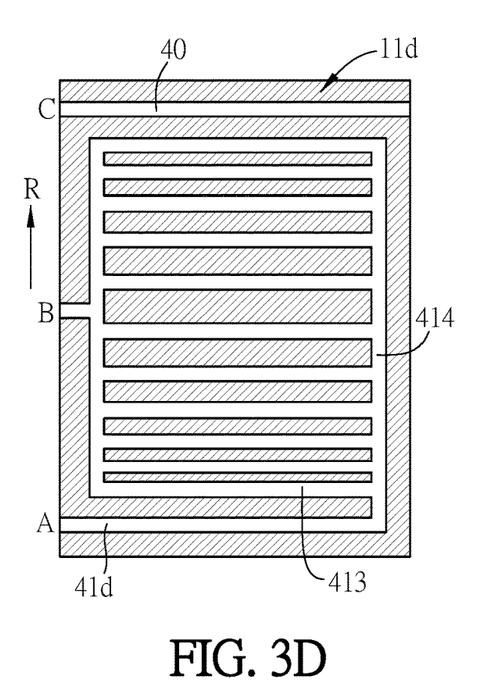

As shown in FIG. 3D, the motor heat exchange pipe 41d includes axial channels 413 and circular channels 414 communicated with each other. The axial channels 413 extend along the axial direction of the first frame 11d, and the circular channels 414 extend along the direction R. As shown in FIG. 3D, for example, the motor heat exchange pipe 41d includes two or more axial channels 413 and two circular channels 414.

In addition, the width of the motor heat exchange pipe can be gradually changed. For example, as shown in FIG. 3C, the width of the axial channel 411 is gradually narrowed from the bottom to the top. Of course, the width of the motor heat exchange pipe shown in other figures can also be gradually changed.

Moreover, the motor heat exchange pipe has different distribution densities in different areas of the first frame. For example, as shown in FIG. 3D, the areas around the positions A and C are configured with more axial channels 413, and the area around the position B is configured with less axial channels 413. Of course, the motor heat exchange pipe can have different distribution densities in other figures.

Figure 4A:
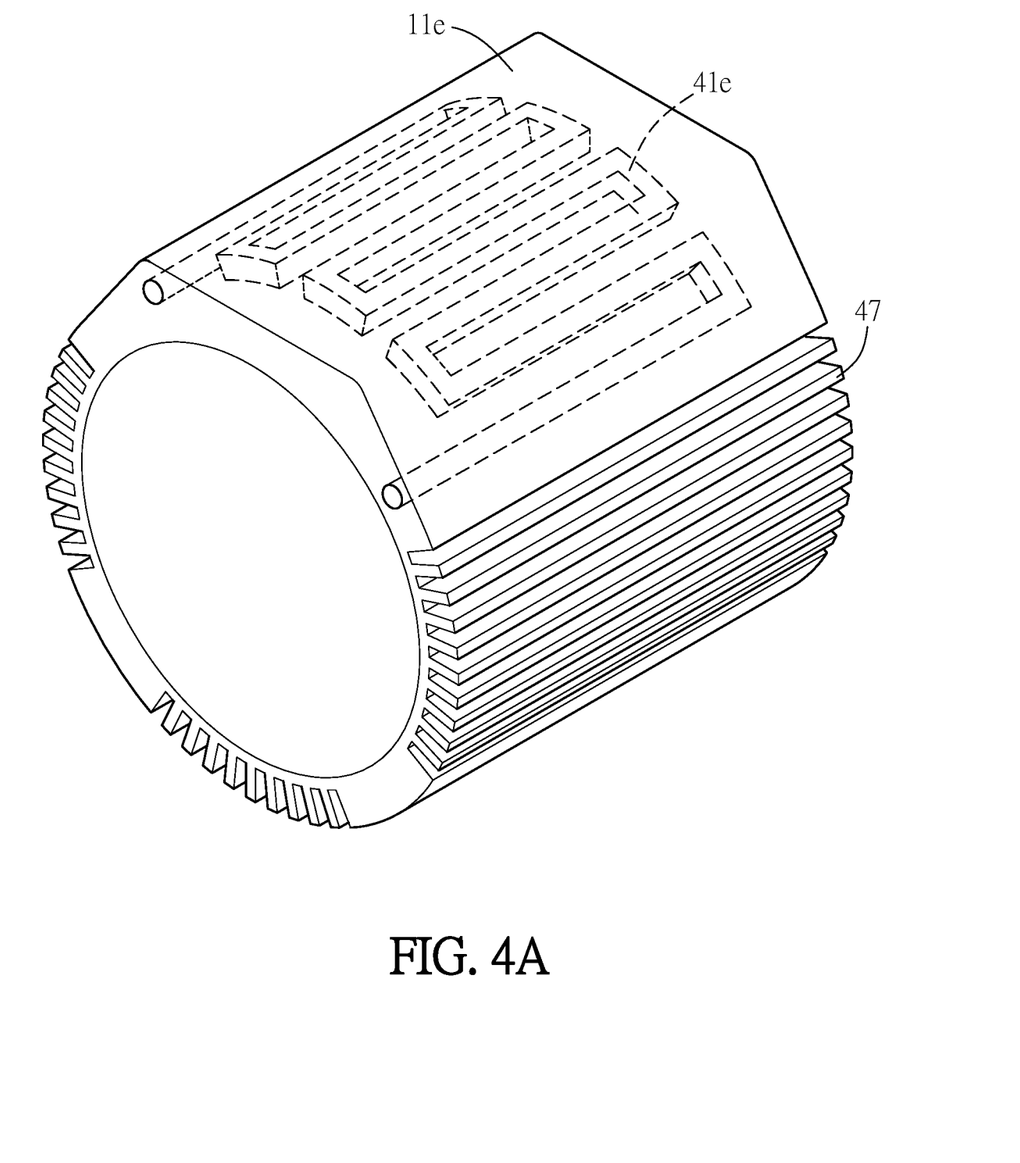
FIGS. 4A to 4C are schematic diagrams showing some modified aspects of the motor heat exchange pipe and the first frame.
Figure 4B:
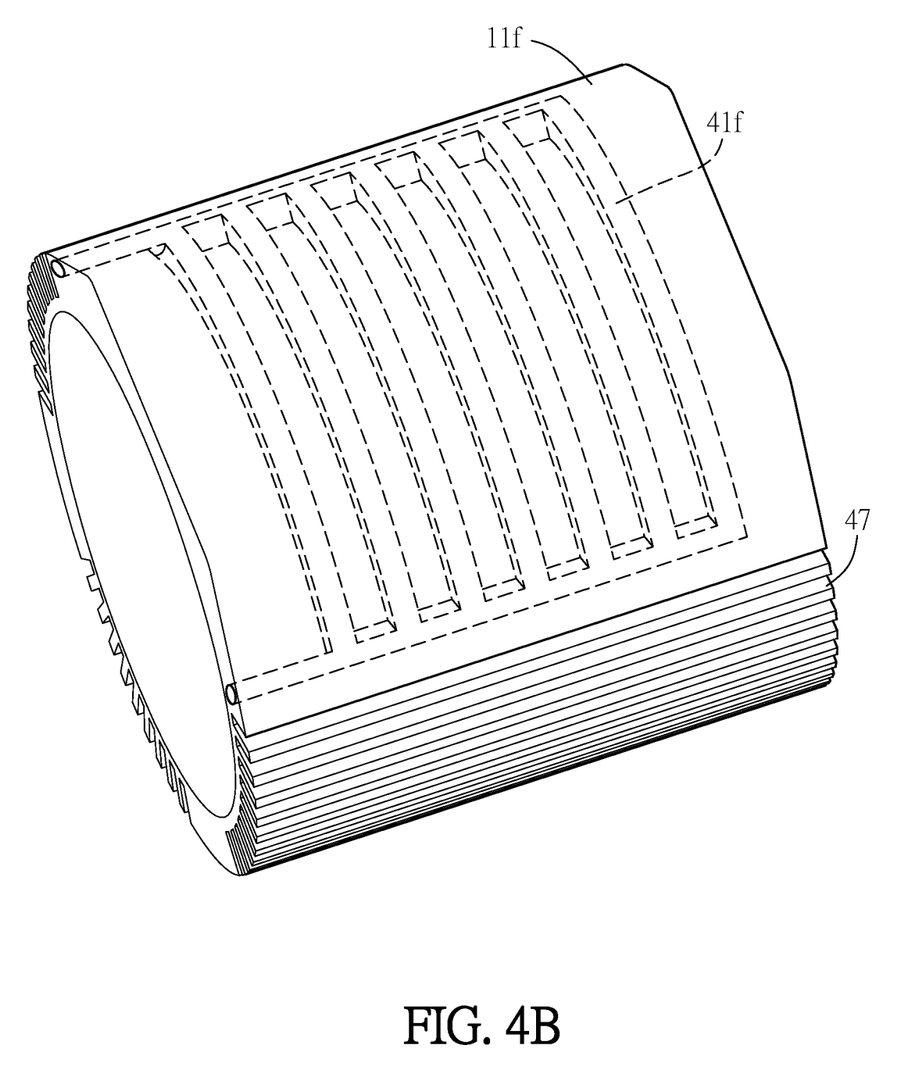
Figure 4C:
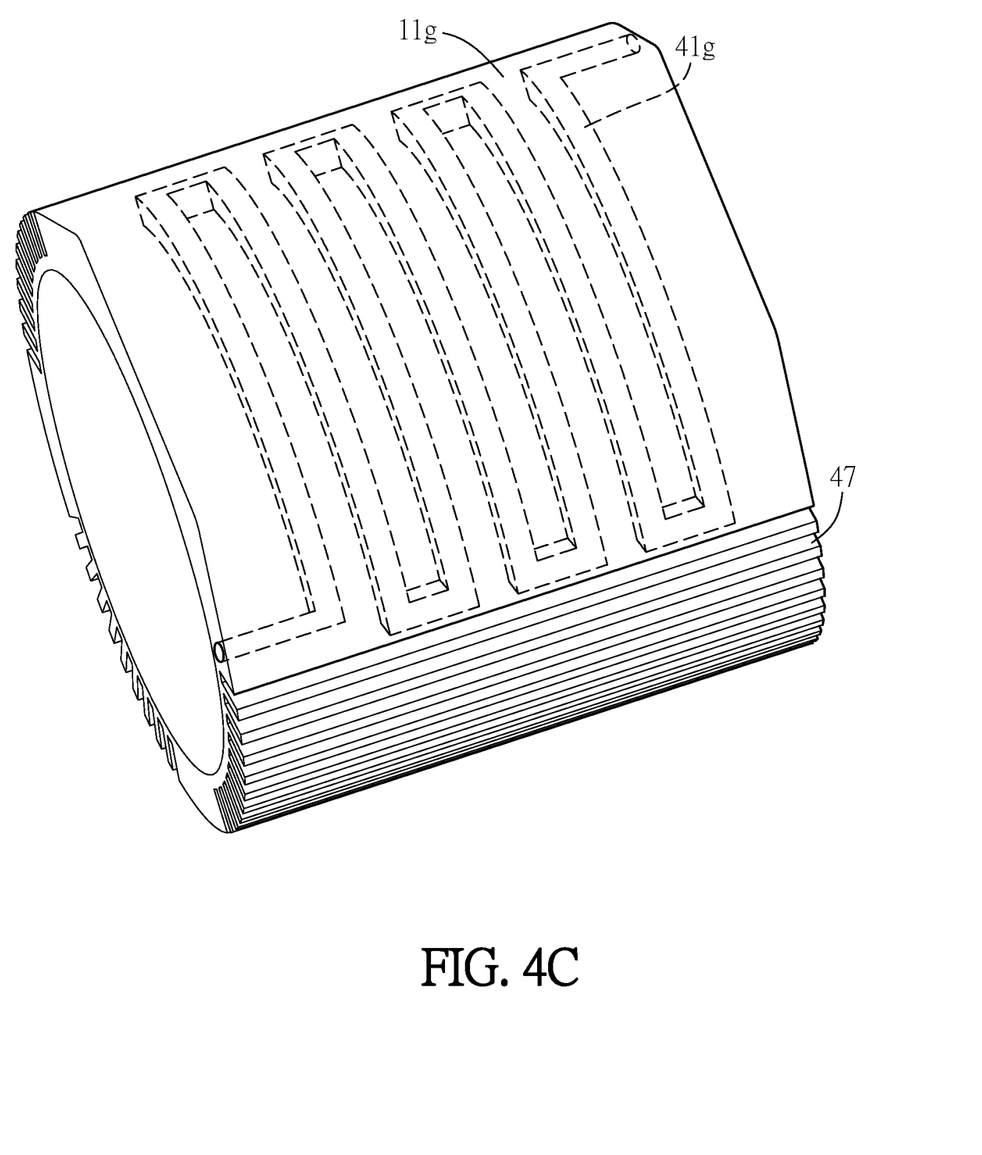

FIGS. 4A to 4C are schematic diagrams showing some modified aspects of the motor heat exchange pipe and the first frame. As shown in FIGS. 4A to 4C, the outer surfaces of the (sleeve type) first frames 11e, 11f and 11g can be configured a plurality of the fins 47. This design can integrate the water cooling and air cooling functions so as to enhance the heat dissipation effect. In addition, the motor heat exchange pipes 41e, 41g and 41g are disposed at the places without fin 47.

As shown in FIG. 4A, the motor heat exchange pipe 41e has a spiral shape. In the motor heat exchange pipe 41e, the straight portions mainly extend along the axial direction of the first frame 11e, and the round portions are distributed along the circumference.

As shown in FIG. 4B, the motor heat exchange pipe 41f includes axial channels and circular channels communicated with each other. The axial channels extend along the axial direction of the first frame 11f, and the circular channels extend along the circumferential direction.

As shown in FIG. 4C, the motor heat exchange pipe 41g has a spiral shape. In the motor heat exchange pipe 41g, the straight portions mainly extend along the circumferential direction, and the round portions are distributed along the axial direction of the first frame 11g.

As shown in FIGS. 4A to 4C, the width of the motor heat exchange pipe can be gradually changed, and the motor heat exchange pipe has different distribution densities in different areas of the first frame.

Figure 5A:
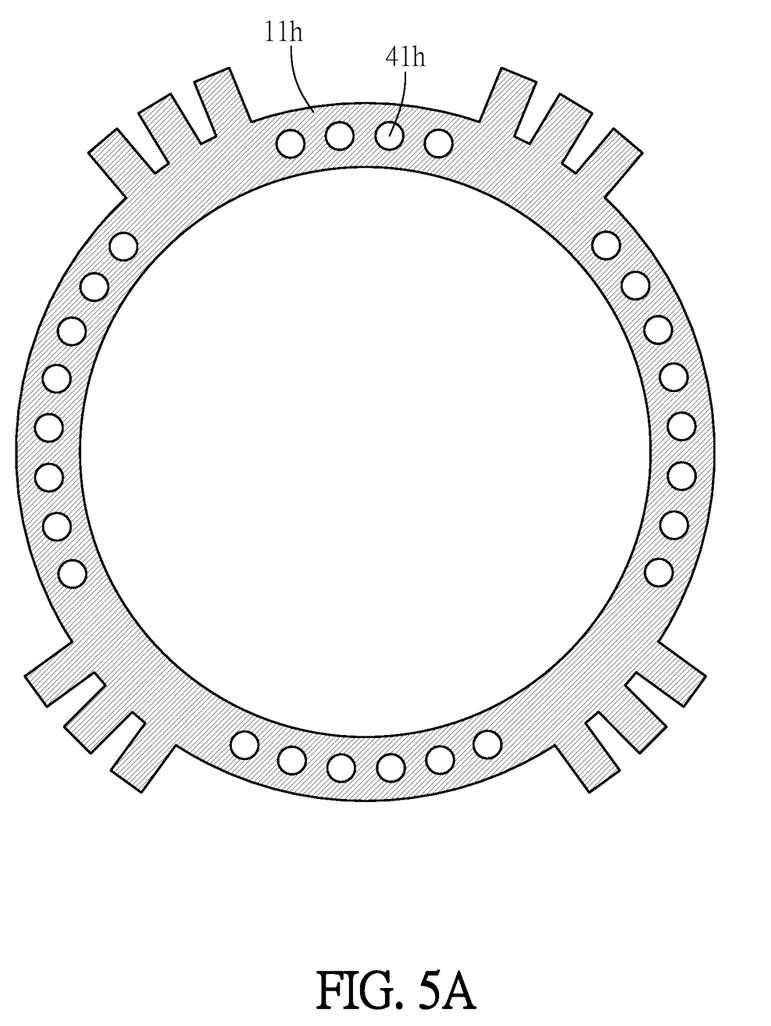
FIGS. 5A to 5C are schematic diagrams showing some modified aspects of the motor heat exchange pipe.
Figure 5B:
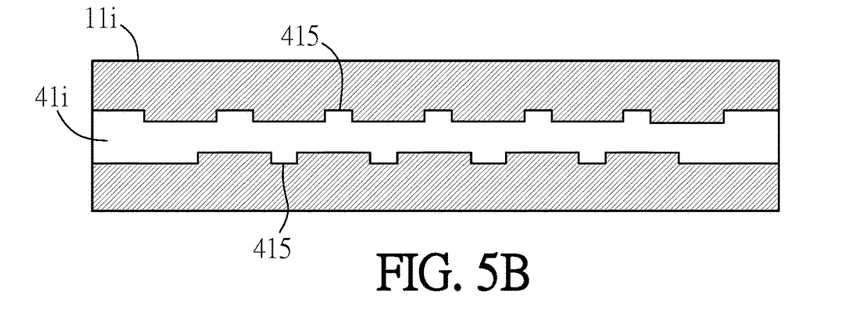
Figure 5C:
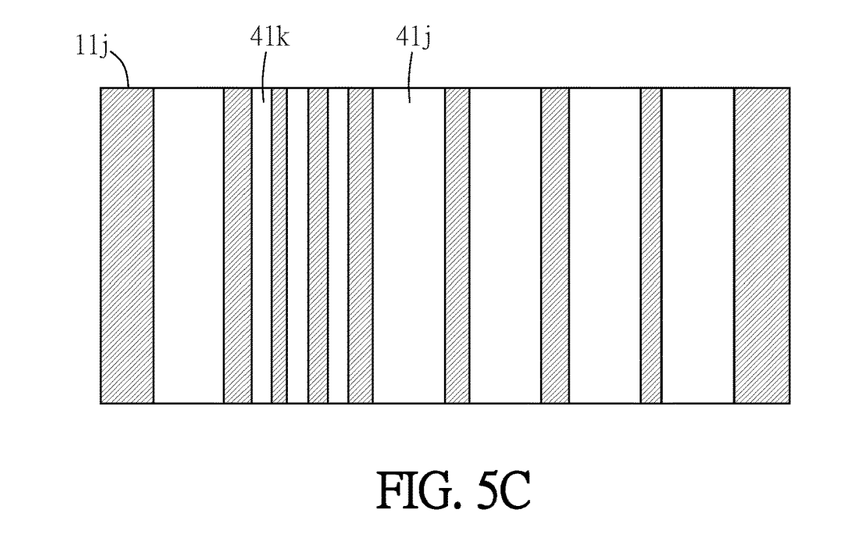

FIGS. 5A to 5C are schematic diagrams showing some modified aspects of the motor heat exchange pipe.

As shown in FIG. 5A, the first frame 11h has a plurality of openings for connecting the motor heat exchange pipes 41h, and the motor heat exchange pipes 41h can be parallel to each other or communicated with each other.

As shown in FIG. 5B, the motor heat exchange pipe 41i further includes a plurality of heat exchange microstructures 415. The heat exchange microstructures 415 are disposed inside the motor heat exchange pipe 41i. The configuration of the heat exchange microstructures 415 can increase the contact surface between the fluid and the motor heat exchange pipe 41i, thereby increasing the total amount of heat exchange. Thus, the fluid can flow through the motor heat exchange pipe 41i and bring away more heat within a unit time so as to enhance the heat dissipation effect.

As shown in FIG. 5C, the widths of the motor heat exchange pipes 41j and 41k can be changed based on the temperature. For example, the portion of the motor having a higher temperature can be configured with the wider motor heat exchange pipe 41j, and the portion of the motor having a lower temperature can be configured with the narrower motor heat exchange pipe 41k.

Figure 5D:
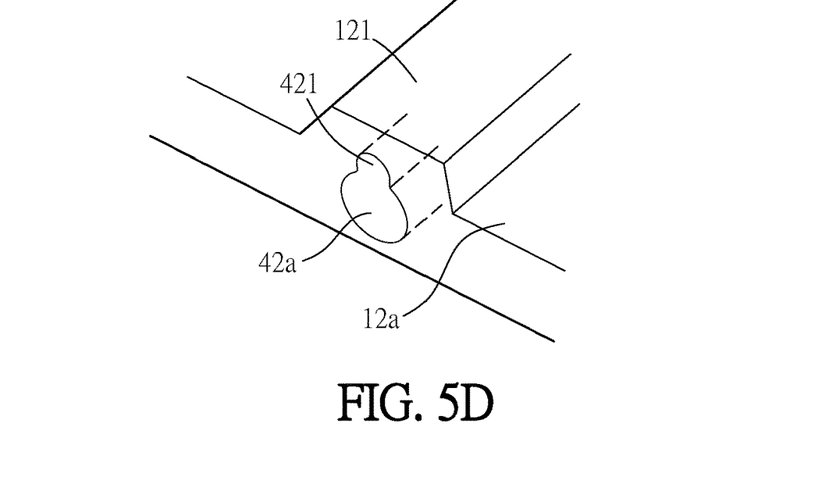
FIG. 5D is a schematic diagram showing a modified aspect of the motor driver heat exchange pipe.

FIG. 5D is a schematic diagram showing a modified aspect of the motor driver heat exchange pipe. As shown in FIG. 5D, the second frame 12a has a protruding portion 121, and the protruding portion 121 forms a heat dissipation element 46. At least a micro flow channel 421 is disposed inside the protruding portion 121 and is communicated with the motor driver heat exchange pipe 42a. For example, the lower side of the micro flow channel 421 is connected to the upper side of the motor driver heat exchange pipe 42a, the upper side of the micro flow channel 421 is connected to the inner side of the protruding portion 121, and the outer side of the protruding portion 121 contacts the heat source (e.g. the transistor).

Figure 6A:
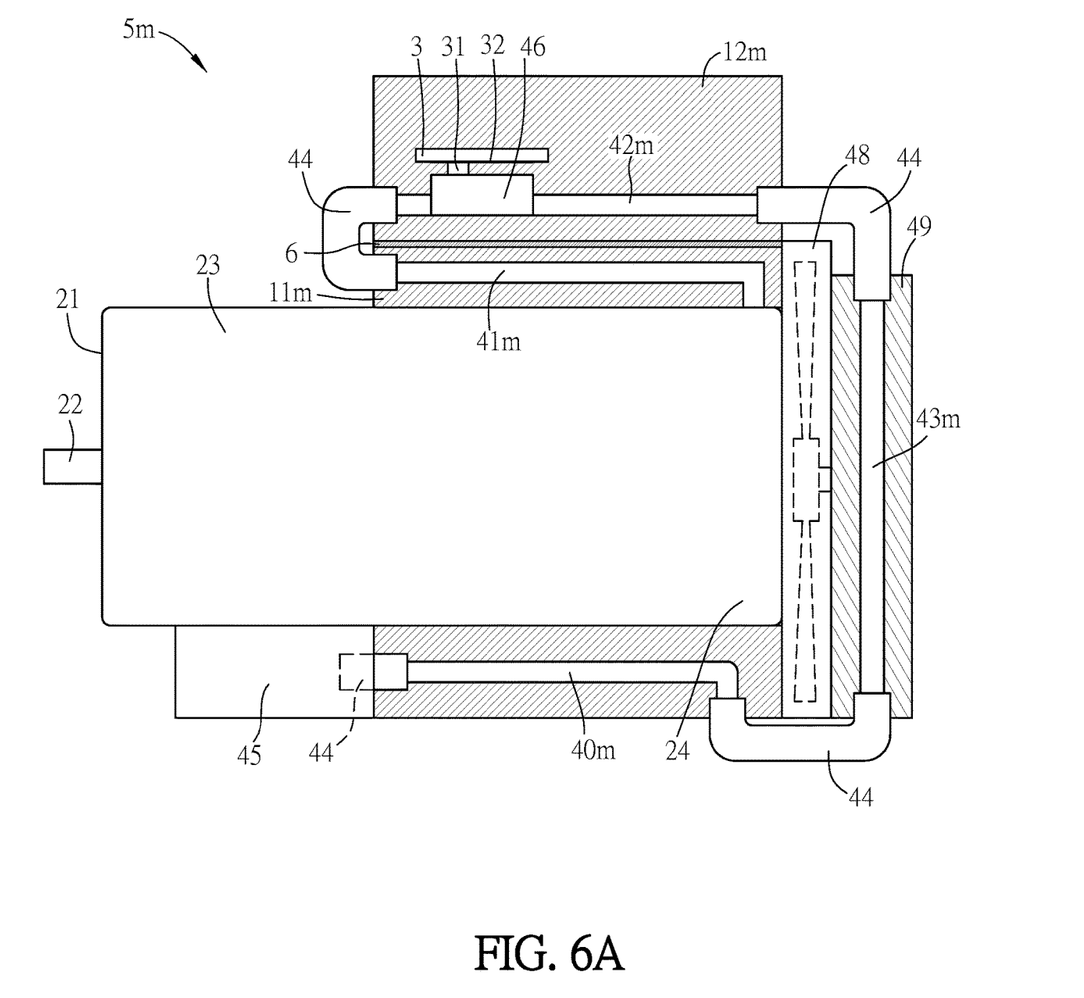
FIGS. 6A and 6B are schematic diagrams showing modified aspects of the integrated motor drive.
Figure 6B:
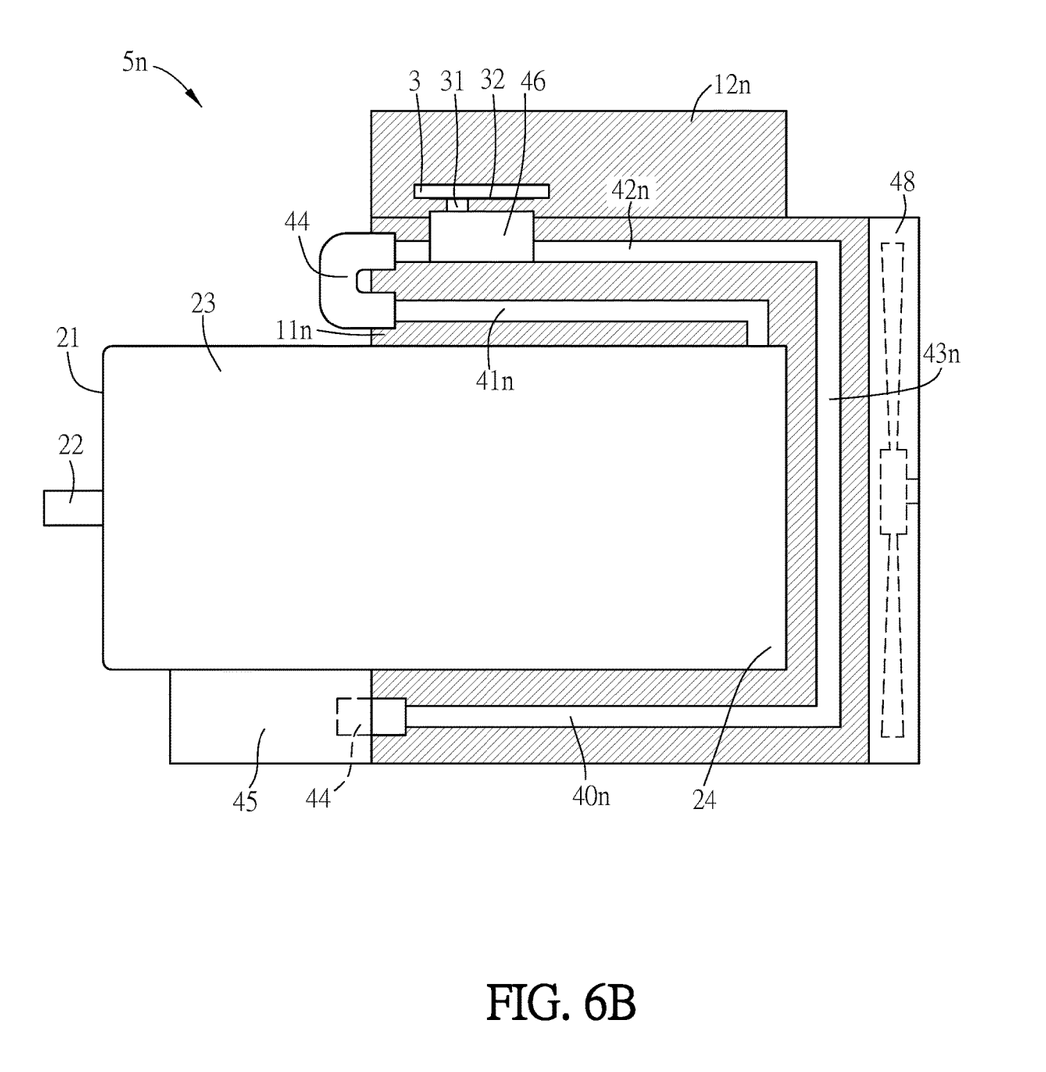

FIGS. 6A and 6B are schematic diagrams showing modified aspects of the integrated motor drive. The components of FIGS. 6A and 6B the same as, similar to and corresponding to those shown in FIGS. 1A, 1B, 2A and 2B will be referred to the same reference numbers.

In the integrated motor drive 5m as shown in FIG. 6A, the motor heat exchange pipe 41m, the motor driver heat exchange pipe 42m, the first frame 11m, and the second frame 12m are integrated formed as one piece, and the material thereof is metal. Accordingly, the assembling speed can be faster. In addition, the additional fan 48 can be provided so as to achieve the integration of the motor 2 and the motor driver 3 and the rapid heat dissipation efficiency. Moreover, a preserved space can be formed between the integrated first frame 11m and second frame 12m, so that the damping element 6 can be disposed in the preserved space. The preserved space has an opening located one side of the first frame 11m and the second frame 12m, and the damping element 6 can be putted into the preserved space through this opening. Furthermore, the heat dissipation pipe 43*m* passes through the cooler 49, and the reflow pipe 40*m* can be integrated with the motor heat exchange pipe 41*m*, the motor driver heat exchange pipe 42*m*, the first frame 11*m*, and the second frame 12*m*. The material of the reflow pipe 40*m* is also metal.

In the integrated motor drive 5*n* as shown in FIG. 6B, the first frame 11*n* covers the side portion 23 and the end portion 24 of the motor 2, and the heat dissipation pipe 43*n* is embedded in the first frame 11*n*. The motor heat exchange pipe 41*n*, the motor driver heat exchange pipe 42*n*, the heat dissipation pipe 43*n*, the first frame 11*n*, and the second frame 12*n* are integrated formed as one piece, and the fan 48 is disposed at the outer side of first frame 11*n*. Alternatively, the integrated motor drive 5*n* may not include the fan 48. In addition, as shown in FIG. 6B, there is no damping element 6 disposed between the first frame 11*n* and the second frame 12*n*. Of course, it is also possible to provide a damping element 6 between the first frame 11*n* and the second frame 12*n*. Referring to FIG. 6A, the damping element 6 can be disposed in the preserved space formed between the first frame 11*n* and the second frame 12*n*. Furthermore, the heat dissipation pipe 43*n* passes through the cooler 49, and the reflow pipe 40*n* can be integrated with the motor heat exchange pipe 41*n*, the motor driver heat exchange pipe 42*n*, the heat dissipation pipe 43*n*, the first frame 11*n*, and the second frame 12*n*. The material of the reflow pipe 40*n* is also metal.

In summary, the integrated motor drive and integrated heat dissipation system of this disclosure have a frame assembly and a heat dissipation assembly, so that the fluid heat exchange pipes can pass through the motor and the motor driver. In addition, the motor heat exchange pipe is disposed on another frame, so that the rapid heat dissipation can be achieved and the assembling can be easier.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An integrated motor drive, comprising:
    a frame assembly comprising a first frame and a second frame;
    a motor installed on the first frame;
    a motor driver installed on the second frame; and
    a heat dissipation assembly, comprising:
        a motor heat exchange pipe embedded in the first frame and located at one side portion of the motor for performing heat exchange with the motor,
        a motor driver heat exchange pipe embedded in the second frame for performing heat exchange with the motor driver, and
        a heat dissipation pipe located at an end portion of the motor and communicated with the motor heat exchange pipe and the motor driver heat exchange pipe,
    wherein the second frame has a protruding portion which forms a heat dissipation element communicated with the motor driver heat exchange pipe and located corresponding to at least a transistor of the motor driver, and which has at least one micro flow channel disposed therein, the at least one micro flow channel has a semicircular cross-sectional shape and is connected to the motor driver heat exchange pipe in parallel along a flow path of the motor driver heat exchange pipe.

2. The integrated motor drive according to claim 1, wherein the heat dissipation assembly further comprises:
    a cooler disposed at the end portion of the motor, wherein the heat dissipation pipe passes through the cooler;
    a plurality of pipe connectors connecting the motor heat exchange pipe, the motor driver heat exchange pipe, and the heat dissipation pipe; and
    a pump driving a fluid to flow in the motor heat exchange pipe, the motor driver heat exchange pipe, and the heat dissipation pipe.

3. The integrated motor drive according to claim 1, wherein the heat dissipation assembly further comprises:
    a plurality of pipe connectors connecting the motor heat exchange pipe, the motor driver heat exchange pipe, and the heat dissipation pipe; and
    a pump driving a fluid to flow in the motor heat exchange pipe, the motor driver heat exchange pipe, and the heat dissipation pipe;
    wherein the first frame covers the side portion and the end portion of the motor, and the heat dissipation pipe is embedded in the first frame.

4. The integrated motor drive according to claim 1, wherein the heat dissipation assembly further comprises:
    a fan disposed at an outer side of the end portion of the motor, and an air outlet of the fan is disposed opposite to the end portion.

5. The integrated motor drive according to claim 1, further comprising:
    a damping element disposed between the first frame and the second frame.

6. The integrated motor drive according to claim 1, wherein the heat dissipation assembly further comprises:
    a plurality of fins disposed on the first frame.

7. The integrated motor drive according to claim 1, wherein the motor heat exchange pipe further comprises:
    a plurality of heat exchange microstructures disposed inside the motor heat exchange pipe.

8. The integrated motor drive according to claim 1, wherein a width of the motor heat exchange pipe is gradually changed.

9. The integrated motor drive according to claim 1, wherein the motor heat exchange pipe has a spiral shape.

10. The integrated motor drive according to claim 1, wherein the motor heat exchange pipe comprises an axial channel and a circular channel communicated with each other.

11. The integrated motor drive according to claim 1, wherein the first frame is a sleeve mounted on the motor.

12. The integrated motor drive according to claim 1, wherein the motor heat exchange pipe has different distribution densities in different areas of the first frame.

13. The integrated motor drive according to claim 1, wherein the motor heat exchange pipe and the first frame are integrally formed as one piece.

14. The integrated motor drive according to claim 1, wherein the motor heat exchange pipe, the motor driver heat exchange pipe, the first frame, and the second frame are integrally formed as one piece.

15. An integrated heat dissipation system applied to a motor and a motor driver, comprising:
    a frame assembly comprising a first frame and a second frame, wherein the motor is installed on the first frame, and the motor driver is installed on the second frame; and a heat dissipation assembly, comprising:
- a motor heat exchange pipe embedded in the first frame and located at one side portion of the motor for performing heat exchange with the motor,
- a motor driver heat exchange pipe embedded in the second frame for performing heat exchange with the motor driver, and
- a heat dissipation pipe located at an end portion of the motor and communicated with the motor heat exchange pipe and the motor driver heat exchange pipe, wherein the second frame has a protruding portion which forms a heat dissipation element communicated with the motor driver heat exchange pipe and located corresponding to at least a transistor of the motor driver, and which has at least one micro flow channel disposed therein, the at least one micro flow channel has a semicircular cross-sectional shape and is connected to the motor driver heat exchange pipe in parallel along a flow path of the motor driver heat exchange pipe.

* * * * *